_United States Patent Office_

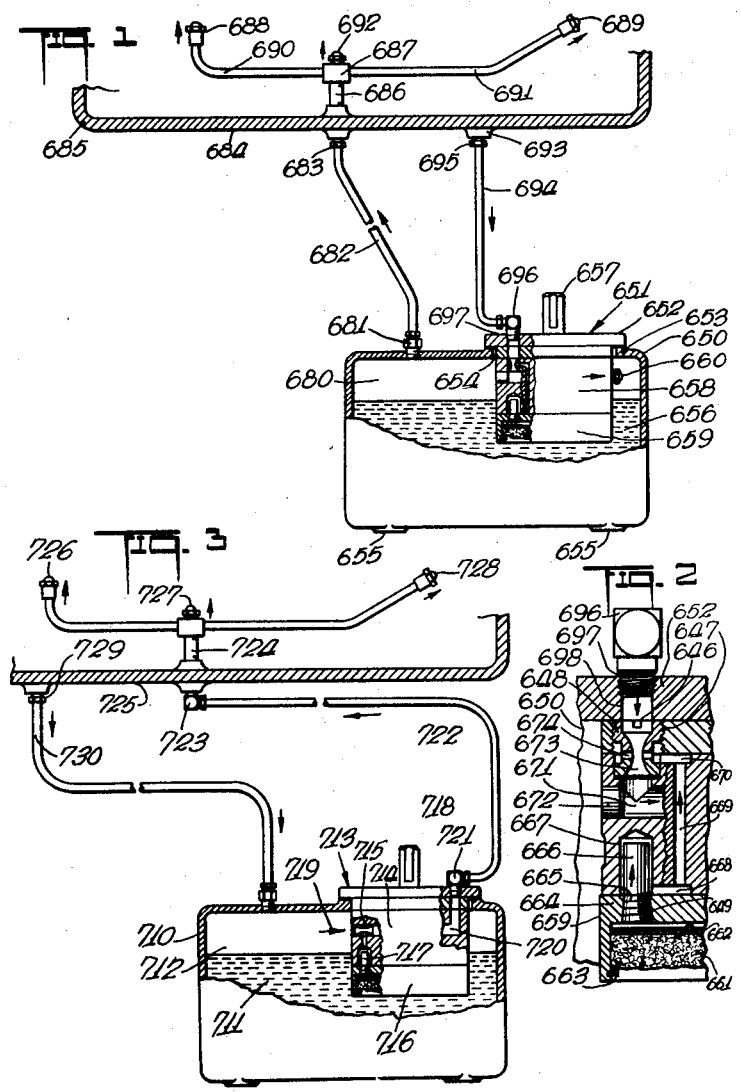

2,917,132
Patented Dec. 15, 1959

2,917,132

LUBRICATION

Thomas R. Thomas, New York, N.Y., assignor to Auto Research Corporation, Dover, Del., a corporation of Delaware Original application January 11, 1949, Serial No. 70,363, now Patent No. 2,691,428, dated October 12, 1954. Divided and this application October 12, 1954, Serial No. 461,720

15 Claims. (Cl. 184—6)

The present invention relates to a lubricating installation and partially relates to a fog lubrication system.

In many lubricating installations, it is customary to feed the lubricant in predetermined proportions through conduits to a bearing or bearings which are to be lubricated.

It has now been found that for certain types of machinery where the bearings are encased and where there may be a desired circulation of gaseous fluids within the casing that a lubricant may be applied to bearings in the form of a fog or dispersion of air-borne or gas-borne lubricant particles of desired spacing and size at a desired circulation rate.

It is among the objects of the present invention to provide improved lubricating installation of a character described for creating a dispersion or flow of suspended lubricant particles which will result in adequate and effective lubrication of bearings within the casing or enclosure which may be advantageously applied to machine tools as well as other machine lubrication.

Still other objects and advantages will appear in a more detailed description set forth below, it being understood that this more detailed description is given by way of illustration and explanation only and not by way of limitation, since various changes may be made by those skilled in the art without departing from the scope and spirit of the present invention.

In accomplishing the above objects, it has been found most satisfactory according to one embodiment of the present invention to provide an enclosure which may form part of the machine, with which is associated an air pump or an air injection system.

This air pump is desirably so associated with lubricant feeding and nozzle means as to cause a fog discharge which will disperse itself and circulate in the desired manner in the casing to lubricate the bearings therein.

In the drawings, which illustrate but several of the possible embodiments of the present invention, these drawings being by way of illustration and not by way of limitation:

Fig. 1 is a schematic side elevational view, partly in section, better to show the reservoir and venturi structure of an embodiment;

Fig. 2 is a fragmentary side sectional view constituting an enlargement of the venturi structure of Fig. 17 to show the detailed construction thereof; and Fig. 3 is a schematic side elevational view showing an alternative embodiment of fog lubricator and machine housing.

Referring to the embodiment of Fig. 1, there is shown a balanced fog lubrication installation, including a lubricant reservoir 650, a pump 658 and a fog producing unit shown in detail in Fig. 18.

The reservoir or oil supply A takes the form of a tank or container 650 having the body of oil 656.

In operation, the machinery enclosed within the housing 685 is continuously supplied with a fog of lubricant from the atomizer element of Fig. 18.

The lubricant reservoir of Fig. 1 has a top portion or cover 652 which carries the air and lubricant pump 658 with the top cover 652 cooperating with a bottom cover 659 and with the intermediate body receiving an eccentric rotary vane device, such as is shown in Patent No. 2,691,428. The top cover 652 carries a bearing for the rotary vane shaft 657 and also has a peripherally extending portion which rests upon the periphery 653 of the opening 654 in the reservoir 650. To give a more detailed description of the embodiment of Fig. 1, the following may be stated.

Referring to Fig. 1, the reservoir 650 receives the fog lubricator unit 651. The cover 652 of the fog lubricator unit 651 is positioned upon the periphery 653 of an opening 654 in the reservoir 650.

The reservoir is provided with the mounting elements 655 and receives the lubricant 656.

The fog lubricator unit 651 has an externally driven shaft 657 which drives the blower or pump unit 658. To the bottom of the pump unit 658 is attached a filter unit 659.

The fog produced by the unit 658 will be ejected through the fog outlet or nozzle 660 in the side of the body 658.

As is best shown in Fig. 2, the filter unit 659 carries the felt filter 661 backed by the metallic screens 662. The filter 661 is held in position by the ring 663. The upper structure 664 of the filter unit 659 has a tapped opening 649 which receives the threaded end 665 of the oil restriction orifice unit 666. The upper outlet end of the unit 666 projects into the socket 667.

The lubricant passes from the socket 667 through the passage 668 into the bore 669 and into the passage 670.

The pump unit 658 will exert a substantial suction upon the chamber 671. The chamber 671 is closed by plug 672. The venturi unit 648 is screwed into the tapped opening 647 in the pump body 658 by the fillister slot 646. This suction will draw upon the venturi hole or passage 673 in the unit 648 having the side openings 674. These side openings 674 will exert a suction upon the passage 670, drawing lubricant up past the filter 661 and through the passages 668, 669 and 670.

The fog or lubricant ejected through the fog outlet 660 will pass into the air space 680 above the lubricant body 656 (see Fig. 1). It will then flow through the coupling connection 681 and through the pipe 682 to the machine housing 685. The pipe or tubing 682 will be connected by the coupling fitting 683 to the wall 684 of the machine housing 685.

The fog then will pass through the short tubing section 686 into the head 687 where it is distributed to the spray nozzles 688 and 689 by the tubing 690 and 691 and directly to the spray nozzle 692.

From the bottom of the reservoir at 693 the return flow tubing 694 is connected by the compression coupling fitting 695. This fitting is connected to the adaptor 696, which has a threaded projection 697 (see Fig. 2) to screw into a tapped opening 698 in the cover 692.

The unit as shown in Figs. 1 and 2 is designed to draw air and lubricant from the machine housing 685 by the tube 694. It will create a fog in the upper air chamber 680 of the reservoir 650.

The larger oil particles will be thrown against the walls of the reservoir 650 and the dry oil fog will then pass through the tubing 682 into the machine housing 685. The dry fog may then be distributed by the nozzles 688, 689 and 692.

This unit will produce a much drier fog than if the fog would be discharged directly from the fog unit 651 into the tubing 682.

In the arrangement shown in Fig. 3, the reservoir 710 has a lubricant body 711 and an upper air body 712.

The fog lubricant unit 713 has a pump section 714 with a venturi unit 715, a filter arrangement 716 and a restriction 717. The pump is driven by the shaft 718.

The venturi unit 715 will draw air directly out of the space 712 as indicated by the arrow 719. This fog will then be forced into the passage 720 to the coupling connection 721 and the tubing 722. From the tubing 722, the lubricant fog will pass through the adaptor 723, into the tube 724, and to the nozzles 726, 727 and 728 inside of the housing 725.

From the bottom of the reservoir, as indicated at 729, the lubricant will flow into the tubing 730 into the reservoir 710.

In the arrangement shown in Fig. 3, the venturi unit 715 is part of the fog pump 714 and the passages 720 and 721 serve to discharge the fog directly to the spray heads or distributors 726, 727 and 728. The excess lubricant and fog will flow back into the reservoir 710 through the pipe 730.

Generally the fog pump of the present invention may well be started before the machine by an auxiliary motor so that the bearings will be immersed in the fog before the machine is started. This may be accomplished automatically by a switch which will start operation of the fog pump at a predetermined interval before the machine is started.

At the same time the fog pump should be alternatively stopped just before or at the same time as the machine being lubricated to avoid sucking in dirt.

The fog lubricator of the present invention may be associated with a fully circulating, partly circulating or non-circulating system with part or all of the fog being condensed and returned to the reservoir.

The present application is a division of application Serial No. 70,363, filed January 11, 1949 now Patent No. 2,691,428, issued October 12, 1954.

Since certain changes may be made in the above lubricating installation and different embodiments of the invention could be made without departing from the scope thereof, it is intended that all matter contained in the above description or shown in the accompanying drawings shall be interpreted as illustrative and not in a limiting sense.

I claim:

1. A fog lubrication installation, comprising a machine casing enclosing bearings to be lubricated by a lubricant fog, a fog producing element mounted to inject a fog into said casing, an air and lubricant pump to cause air and lubricant to be passed through said element and cause a fog, conduit means for supplying air and lubricant from said casing to said air and lubricant pump, a lubricant reservoir and a fog conduit leading from said reservoir to said casing, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

2. A fog lubrication installation, comprising a machine casing enclosing bearings to be lubricated by a lubricant fog, a fog producing element mounted to inject a fog into said casing, an air and lubricant pump to cause air and lubricant to be passed through said element and cause a fog, a lubricant reservoir and a fog conduit leading from said reservoir to said casing, said air and lubricant pump having a conduit returning lubricant to it from said machine casing, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

3. A fog lubrication installation, comprising a machine casing enclosing bearings to be lubricated by a lubricant fog, a fog producing element mounted to inject a fog into said casing, an air and lubricant pump to cause air and lubricant to be passed through said element and cause a fog, a lubricant reservoir and a fog conduit leading from said reservoir to said casing, said fog producing element including a lubricant nozzle and an air jet means to blow air past said nozzle fed from said air conduit, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

4. A fog lubrication installation, comprising a machine casing enclosing bearings to be lubricated by a lubricant fog, a fog producing element mounted to inject a fog into said casing, an air and lubricant pump to cause air and lubricant to be passed through said element and cause a fog, a lubricant reservoir and a fog conduit leading from said reservoir to said casing, said fog producing element including a venturi tube member, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

5. In a machine housing containing bearings to be lubricated by a lubricant fog, a lubricant reservoir containing an air and lubricant pump, a fog producing device mounted in the pump and lubricant and air feed means actuated by said pump and causing air and lubricant to pass to said device to cause said device to inject a fog into said housing, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

6. In a machine housing containing bearings to be lubricated by a lubricant, a lubricant reservoir containing an air and lubricant pump, a fog producing device mounted in the pump and lubricant and air feed means actuated by said pump and causing air and lubricant to pass to said device to cause said device to inject a fog into said housing, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

7. In a machine housing containing bearings to be lubricated by a lubricant fog, an air and lubricant pump including a fog producing device, and lubricant and air feed means actuated by said pump and causing air and lubricant to pass to said device to cause said device to inject a fog into said housing, said means including said air and lubricant pump, a lubricant reservoir and conduits from said pump and reservoir to said device, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

8. In a machine housing containing bearings to be lubricated by a lubricant fog, a lubricant reservoir containing an air and lubricant pump, a fog producing device mounted in the pump and lubricant and air feed means actuated by said pump and causing air and lubricant to pass to said device to cause said device to inject a fog into said housing, said device including a venturi tube connected to said lubricant and air feed means, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

9. In a machine housing containing bearings to be lubricated by a lubricant fog, a lubricant reservoir containing an air and lubricant pump, a fog producing device mounted in the pump and lubricant and air feed means actuated by said pump and causing air and lubricant to pass to said device to cause said device to inject a fog into said housing, said device including an aspirator connected to said lubricant and air feed means, said lubricant reservoir having a top portion carrying said air and lubricant pump and said air and lubricant pump being provided with a recessed body having top and bottom covers, an eccentric rotary vane device with a shaft positioned in said recessed body, the bottom cover having a filter and the top cover carrying a bearing for the rotary vane shaft and also carrying a mounting on the top portion of the lubricant reservoir.

10. A lubricating installation for producing a lubricant fog or mist and conveying the fog or mist to casing bearings to be lubricated comprising a lubricant reservoir having a lower lubricant space and an upper air space, a rotary air and lubricant pump having means to create a fog of lubricant, said pump having a body with a recess, an air and lubricant impeller in said recess, and lubricant and air fog producing means to one side of said recess actuated by said pump and an air fog discharge nozzle connected to the other side of said recess.

11. The installation of claim 10, said body having a top cover with a bearing for said impeller and having a bottom cover receiving a strainer.

12. The installation of claim 10, said means to create a fog consisting of a venturi tube and a restricted inlet device to supply lubricant to said venturi tube.

13. In a centralized lubricating installation, a fog lubricant pump comprising a body having a center cylindrical recess, an eccentric sliding vane carrier mounted in said recess having a central shaft, upper and lower covers closing the top and bottom of said recess, said body having an air inlet and a lubricant inlet to said recess through which inlets air and lubricant are drawn by said pump, said pump having means to create a fog of lubricant, said means being actuated by the air and lubricant drawn through said inlets by said pump and a fog outlet from said recess through which said fog is forced by said pump.

14. The installation of claim 13, said lower cover also carrying a lubricant restriction obstructing the lubricant inlet and said fog-creating means being positioned in communication with said air inlet and containing a venturi tube device.

15. A lubricant fog lubrication pump of the type designed to supply a lubricant mist into an enclosure containing bearings to be lubricated comprising a reservoir casing having a lower lubricant storage space and an upper air-lubricant mist storage space, a cover for said reservoir carrying a depending air-lubricant pump extending downwardly through the air space into the lubricant storage space, said pump having a fog outlet into the upper space, having one inlet from said enclosure to receive lubricant and lubricant mist therefrom, and having another filter inlet from the lubricant space, and said upper space having a conduit connected to said enclosure to feed lubricant mist thereto.

References Cited in the file of this patent

UNITED STATES PATENTS

| | | |
|---|---|---|
| 524,318 | Gill | Aug. 14, 1894 |
| 1,773,477 | Chisholm | Aug. 19, 1930 |
| 1,824,540 | Gronkwist | Sept. 22, 1931 |
| 1,967,033 | Lipman | July 17, 1934 |
| 1,967,251 | McFerren | July 24, 1934 |
| 2,042,575 | Worth | June 2, 1936 |
| 2,531,411 | Davenport | Nov. 28, 1950 |